United States Patent [19]
Seibert

[11] Patent Number: 4,534,869
[45] Date of Patent: Aug. 13, 1985

[54] PORTABLE WATER FILTRATION SYSTEM FOR OIL WELL FRACTIONATION

[76] Inventor: Darrel L. Seibert, 3724 Country Club Dr., Cuyahoga Falls, Ohio 44224

[21] Appl. No.: 492,877

[22] Filed: May 9, 1983

[51] Int. Cl.³ ............................................. B01D 37/00
[52] U.S. Cl. .................................... 210/788; 210/806; 210/241; 210/251; 210/259; 210/416.1
[58] Field of Search ............ 210/259, 295, 297, 360.1, 210/416.1, 512.1, 781, 787, 806, 170, 241, 251, 788

[56] References Cited
U.S. PATENT DOCUMENTS

| | | | |
|---|---|---|---|
| 2,397,718 | 4/1946 | Albertson | 210/295 |
| 3,502,220 | 3/1970 | Kohlberg | 210/416.1 |
| 3,572,582 | 3/1971 | Seielstad | 210/416.1 |
| 3,630,365 | 12/1971 | Woodbridge et al. | 210/241 |
| 3,954,611 | 5/1976 | Reedy | 210/241 X |
| 4,366,063 | 12/1982 | O'Conner | 210/241 X |
| 4,396,504 | 8/1983 | Tannehill | 210/180 |

FOREIGN PATENT DOCUMENTS 528938 10/1974 U.S.S.R. ............................ 210/416.1

*Primary Examiner*—Thomas Wyse
*Attorney, Agent, or Firm*—Oldham, Oldham & Weber Co.

[57] ABSTRACT

The invention comprises a portable, multi-stage filtration system utilized in filtering water for an oil and gas stimulation process commonly known as fracking. Three stages are used, the first being a straining operation reducing the size of particulate matter in the water to about three-eighths of an inch. The second stage is a centrifugal separator, reducing the particle size to about 50 microns. The final stage utilizes a cartridge-type filter giving a final particle size in the water of about 5 microns. In this manner, water which is injected into the well head during the fracking process and which is obtained from readily available sources such as ponds, streams and the like is relatively free of particulate matter which can foul the fracking process. The invention, by virtue of being mounted on a trailer, is portable and thus can be easily moved from site to site. Water flow rates obtained using the invention are between 250 and 300 gallons per minute, sufficient for processing a small to medium sized well.

7 Claims, 2 Drawing Figures

PORTABLE WATER FILTRATION SYSTEM FOR OIL WELL FRACTIONATION

TECHNICAL FIELD

The invention herein lies in the art of filtration systems and more particularly in the field of water filtration systems for oil and gas well processing. Specifically, the invention is a multi-stage filtration system which can be mounted on a trailer or mud boat and is completely self-contained.

BACKGROUND ART

Various methods have heretofore been utilized for increasing the production from an oil or gas well. Contrary to popular belief, an oil or gas strike is not normally manifested by a "gusher", wherein recovery is effected by simply connecting a production line to a flowing river of oil. In reality, the overwhelming majority of oil and gas is recovered only through extraordinary means, and indeed, until the recent energy crisis, a large percentage of petroleum deposits were deemed unrecoverable. Since that time, there has been a proliferation of oil stimulation processes which in some instances can increase ten fold the amount of oil recoverable, albeit at a somewhat increased cost.

One such stimulation method involves the fracturing of the hydrocarbon bearing strata by injecting a fluid through the casing under high pressure. The fluid in prevalant use is water and this process has come to be known as "fracking". The fracking process, as it breaks apart the rock, vastly increases the surface area and creates channels through which the hydrocarbons can escape and thus be recovered.

The success of the fracking operation at a given well site has been found to be directly dependent on the quality of water used in the fracking process. That is, the less particulate contamination in the fracking water, the better is the recovery of the hydrocarbons. This is especially true when one observes the production life of the well by studying the decline curve vs. similar wells using water of different purities. This can be explained in terms of loss of pore surface area when water having a high amount of silt or other particulates is used in the process. In these instances, the particulates plug the newly exposed pores in the rock, thus defeating the ultimate goal of the fracking process. It has therefore been incumbent upon oilmen to utilize the highest quality water available at a drilling site. Unfortunately however, the most economical and often times the only source of water is a nearby stream or pond from which water is obtained by pumping, which necessarily results in the water being contaminated with silt, gravel, algae and the like. In addition, many times the frack tanks which hold the water from previous jobs, contain salt water, oil, sand sludge and other contaminates that can greatly reduce the chances of success and longevity of the well.

Heretofore, filtration devices, when used, have been utilized at large stationary well sites such as off shore drill sites or very deep, expensive locations such as in Texas or Louisiana where the transport of heavy filtration equipment has been deemed economically feasible. The importance of filtering the water is now just starting to be understood by the small independent in the Appalachians Basin. For the first time a portable unit designed to meet the economic constraints of the small independent producer is being offered with this invention.

What is needed, essentially, is a water filtration system which is scaled for use at smaller sites and which is portable, in that it can be moved from site to site upon short notice. This need is met by the instant invention.

DISCLOSURE OF THE INVENTION

It is accordingly an aspect of the invention to provide a water filtration system for use in oil and gas well stimulation.

It is another aspect of the invention to provide a water filtration system, as above, which is portable.

It is still another aspect of the invention to provide a water filtration system, as above, which is continuous.

It is yet another aspect of the invention to provide a water filtration system, as above, which is multistage.

It is still another aspect of the invention to provide a water filtration system that provides a duplex strainer that will remove all large pebbles and flotsam up to three-eights of an inch in diameter.

It is still another aspect of the invention to provide a water filtration system, as above, which can remove particulate matter to five microns.

It is yet another aspect of the invention to provide a water filtration system, as above, which utilizes a separator.

It is still another aspect of the invention to provide a water filtration system, as above, which utilizes a self priming pump directly driven by a engine.

It is yet another aspect of the invention to provide a water filtration system, as above, wherein the filtration system is secured to a trailer and can be towed to the well by either truck or dozer.

It is still another aspect of the invention to provide a water filtration system, as above, wherein the trailer can be dragged as a sled through deep mud.

It is yet another aspect of the invention to provide a water filtration system, as above, wherein the pump and engine are removably secured to the trailer and replaced quickly as a module if a breakdown occurs.

It is still another aspect of the invention to provide a water filtration system, as above, which can be used in secondary recovery processes or in disposal wells.

These aspects and others being described more fully hereinbelow, are achieved by: a portable water filtration apparatus comprising: a duplex strainer; a self priming centrifugal pump having its suction side in communication with said strainer; a centrifugal separator connected to the discharge side of said pump; a cartridge filter connected to the said centrifuge; wherein said pump is powered by an engine using a flexible, direct drive means; and wherein the apparatus filters from about 250 to about 300 gallons per minute of water, the average particle size of particulate matter in said filtered water being less than 5 microns.

BRIEF DESCRIPTION OF THE DRAWINGS

To more fully understand the teachings of the invention, the following detailed description should be read in conjunction with the figures, wherein.

BEST MODE FOR CARRYING OUT THE INVENTION

Figure 1:
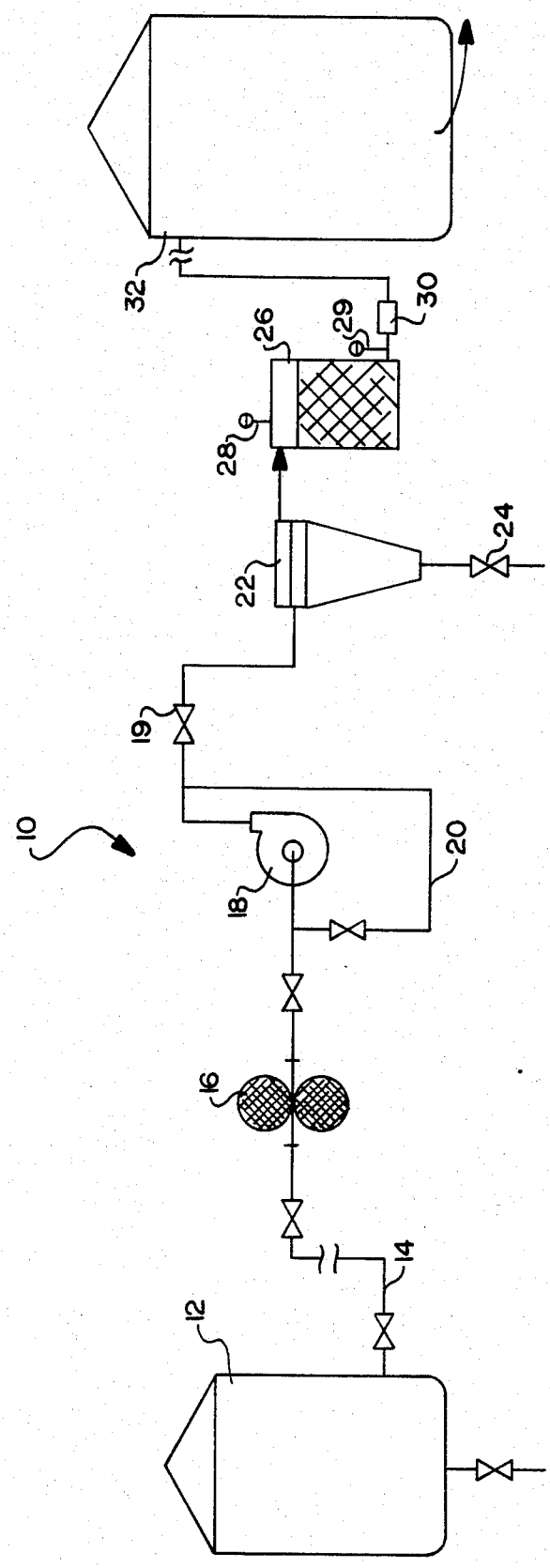
FIG. 1 is a schematic drawing, showing the various filtration stages of the invention.

The invention can best be illustrated with reference to the drawings, wherein the filtration system of the invention is indicated generally by the number 10. A nurse tank 12 functions as a holding tank, receiving water from a source such as a pond, stream, or water trucked in from a pond or a stream. As such, the water contains a considerable amount of silt, gravel, dirt, algae, bacteria and other debris. From the nurse tank, the water is conveyed to a duplex strainer 16 by a feed line 14. Suction through the strainer is provided by a self priming centrifugal pump 18 downstream of the strainer. The pump has a bypass line 20. The duplex strainer has two separate filtration chambers, only one of which is utilized at any given time. When the chamber currently in use becomes loaded, the flow is switched to the unused chamber and the accumulated debris removed from the former. In this way, constant flow is maintained. Generally, the strainer removes particulate matter to about three-eighths of an inch in diameter, however the strainer can be set up to pass any of a number of various particle sizes depending on the particular mesh size of the screen installed. Three-eighths is however preferred, as this size eliminates large chunks of rock and the like, yet is not so fine as to require constant turnaround.

The second filtration stage is a centrifugal separator 22. At this stage, the water is filtered down to about 200 mesh, which is approximately equal to 50 microns. A pinch valve 19 is used to control the flow of water through the system to insure that the centrifugal separator operates at maximum efficiency. The particulate matter leaves the separator through a pinch valve 24 while the water passes to the third filtration stage which utilizes a 34 unit disposable cartridge system and reduces the particle size of impurities in the water to about 5 microns. A pinch valve 28 is used to purge the system of contaminates periodically.

From the cartridge filter, the water passes to one of a plurality of frack tanks 32. Thereafter the water is employed conventionally in the fracking process.

Figure 2:
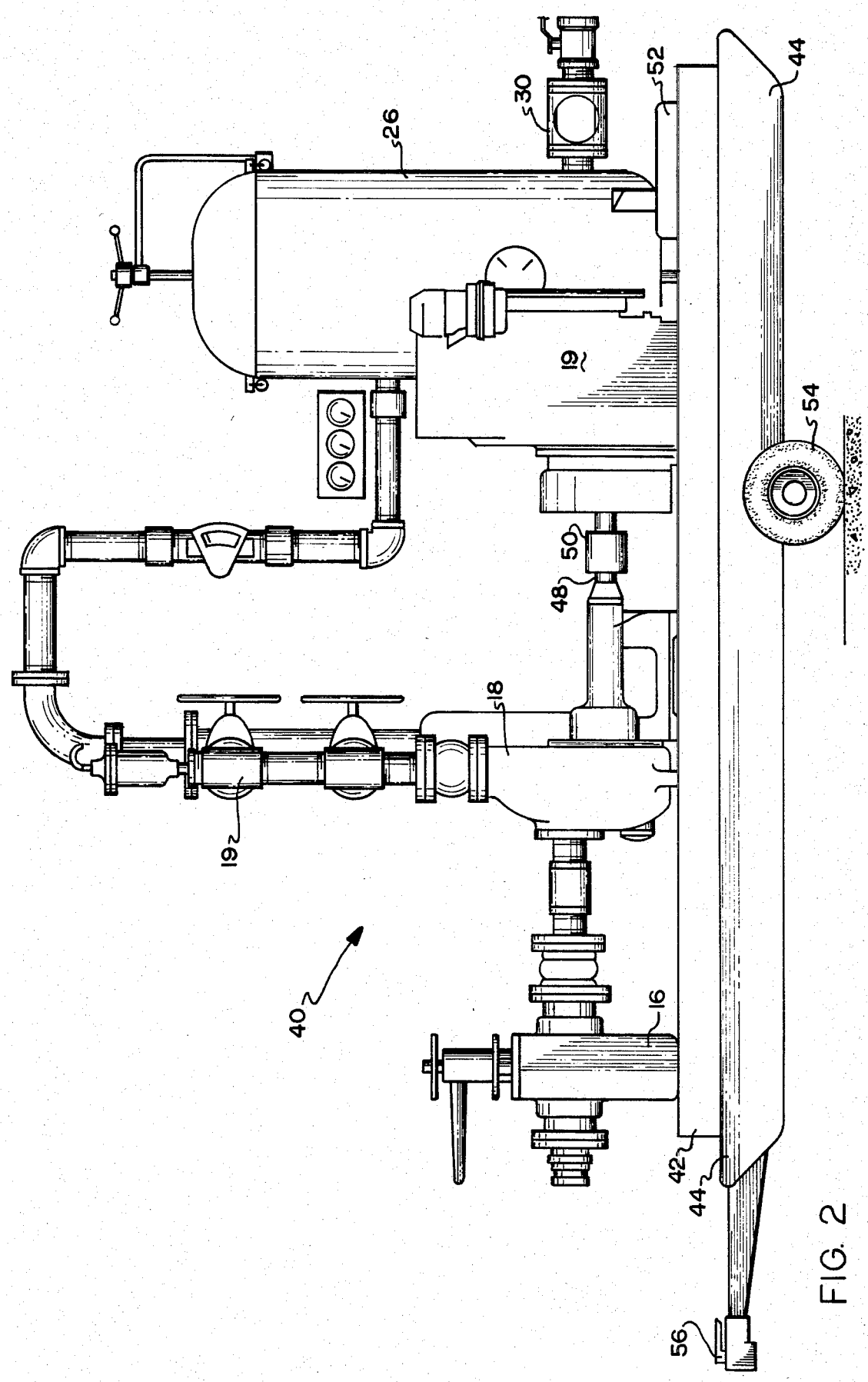
FIG. 2 illustrates the disposition of the invention on a portable trailer.

Specifically with reference to FIG. 2, the invention is shown mounted on a trailer bed 40. The pump 18, its drive 19 and the duplex strainer 16 are secured to a platform 42 which is removably attached to the trailer. This allows replacement as a unit on the trailer without disturbing the other components of the invention. The pump is connected to the power source through a flexible shaft 48 and a coupling 50. By utilizing direct drive, power losses are minimized and unnecessary complications in the drive system are eliminated. Generally, any type of power source conventional in the art can be used, such as a diesel or gasoline powered engine if the proper criteria is met. The trailer has bow sections 44 at the front and rear which allow it to be dragged in sled-like fashion when the terrain is otherwise unsuitable. In more ordinary circumstances the trailer is transported on conventional wheels 54. For travel on roads, the trailer contains a plurality of tail lights 46 so as to comply with local motor vehicle laws. The trailer also contain a fuel tank 52 for the pump power source allowing several hours of continuous pumping time.

While the invention may utilize any one of a number of various commercially available components, it has been found that certain combinations are preferred. In general, it is extremely important to match the desired filtering rate with the most efficient operating ranges of the self priming pump and the power source. Doing so minimizes horse power requirements while maximizing fuel efficiency and hence cost effectiveness. In a majority of situations, a water filtering rate of from about 250 to about 300 gallons per minute (GPM) is desired, while about 280 is preferred. This rate will provide enough water in a reasonable time to process an average sized well. Once the flow rate is fixed, the pump is sized accordingly to operate in its most efficient range (65 to 66% of maximum output) and at the proper discharge pressure which is usually from about 75 to 80 pounds per square inch (psi).

A specific combination of components which satisfies the above criteria includes a Haywood Duplex strainer, Model 50 with a three-eighths mesh and four inch pipe size, a Gorman-Rupt Model 03A with three inch inlet and outlet, a Lakos vertical separator Model N-2036-FD and a Nowata 34 element filter. With this combination, an air cooled diesel engine power source is used to drive the pump at between 2100 and 2300 RPM, thus operating the engine at optimum RPM. To provide the correct flow rate, the 12 inch standard impeller of the pump was replaced with an 11 inch model.

The critical separation stage is the second, i.e., the vortex or centrifugal separator. This device has no moving parts and relies on tangential positioning of the inlet stream to produce a centrifugal effect. The solid material is thereby forced from the bottom of the separator. Because the centrifugal effect is a function of the inlet velocity and flow rate, these parameters must be carefully monitored. Too low a flow rate will result in inefficient use of the separator, while too high a flow will cause less than satisfactory solid removal. Flow rate is controlled by a pinch valve 19 located at the pump discharge. This valve is often times partially closed at the beginning of a filtration cycle and is gradually opened as solids accumulation in the Nowata filter causes a drop in the pump discharge pressure.

Regarding the cartridge filter, pressure gauges 28 and 29 at the inlet and outlet respectively measure pressure drop across the filter and hence the degree of clogging with debris. The cartridges provide a deep filtering action and are disposable. In the Nowata filter mentioned above, the cartridges are 30 inches long and are constructed of a plastic like material. As a check on water clarity leaving the filter, a sight glass 30 is provided in the exit stream.

A number of other oil related processes besides fracking benefit from filtered water and thus are candidates for use of the invention. In secondary recovery, for example, water injected into the well must penetrate the hydrocarbon bearing rock and is hindred by silt and debris. Similarly, disposal wells which return salt water underground are hindered when pores in the rock strata are plugged. The invention can be used in unmodified form for these and indeed many other applications which require large quantities of clarified water.

From the above disclosure, it can be seen that the objects of the invention have been met by the device described. The various elements of the invention are small enough so that the entire apparatus, less the nurse tank and the frac tanks, can be mounted on a portable trailer. The trailer is attachable to a variety of vehicles by a Penal or convalent hitch. In this fashion, remote drilling areas can be reached.

Although the best mode and the preferred embodiments have been disclosed as required by the Patent Statutes, it is to be understood that various modifications can be made to the invention without departing from the scope thereof. Rather, the true scope of the invention should be measured by the following attached claims.

What is claimed is:

1. A portable water filtration apparatus for filtering water used in oil well processes comprising:
   a duplex strainer;
   a self priming centrifugal pump having its suction side in communication with said strainer and having a pinch valve to control flow;
   a centrifugal separator connected to the discharge side of said pump;
   a cartridge filter connected to the discharge side of said centrifuge; and
   a trailer with wheels and upturned bow at either end with the capability to travel over any type of terrain by being towed in typical fashion or dragged in sled-like fashion;
   wherein said strainer, pump, separator and cartridge filter are mounted on said trailer;
   wherein said pump is powered by an engine using a flexible, direct drive means;
   wherein the apparatus filters from about 250 to about 300 gallons per minute of water, the average particle size of particulate matter in said filtered water being less than 5 microns; and
   wherein said strainer, pump, separator and cartridge filter are carefully matched and arranged to enable the filtration system to attain maximum and eliminate particulates down to 5 microns.

2. An apparatus according to claim 1, wherein said filtration system includes a fuel tank for said engine.

3. An apparatus according to claim 2, wherein said pump and said engine are removably secured to said trailer by means of a platform.

4. An apparatus according to claim 3, wherein said water is fed to said strainer by a nurse tank and said filtered water fed to one of a plurality of frack tanks.

5. An apparatus according to claim 4, wherein said flow rate of said water is about 280 gallons per minute.

6. A portable method for filtering water used in oil well processes comprising:
   straining particulate matter in water from a nurse tank to three-eights of an inch in a duplex strainer;
   pumping said water with a centrifugal pump at a rate from about 250 to about 300 gallons per minute from said strainer;
   centrifuging said water from said pump in a centrifugal separator, reducing the particle size of said matter to 50 microns;
   filtering said water from said separator in a cartridge filter, reducing the particle size of said matter to 5 microns; and
   means for transporting an apparatus which embodies said method over any type of terrain to almost any location either easily accessable or accessable with difficulty.

7. A method according to claim 6, wherein said duplex, said pump, said centrifugal separator and said cartridge filter are mounted on a trailer with wheels and upturned bow at either end with the capability to travel over any type of terrain by being towed in typical fashion or being dragged in sled-like fashion.

* * * * *